UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,051,317.      Specification of Letters Patent.      Patented Jan. 21, 1913.

No Drawing.      Application filed June 21, 1911. Serial No. 634,565.

*To all whom it may concern:*

Be it known that I, CARLETON ELLIS, a citizen of the United States, and now residing at Montclair, county of Essex, and State of New Jersey, have made a certain new and useful Invention Relating to Finish-Removers, of which the following is a specification.

This invention relates especially to finish removers preferably containing a small proportion of effective film forming waxy evaporation retarding material incorporated with the finish solvents preferably in connection with non-waxy stiffening material, such as celluloid or other pyroxylin thickeners, there also being preferably included in the remover solvents a small proportion of relatively non-volatile neutral solvent liquid. Celluloid, which is readily obtainable in the form of scrap celluloid, forms a desirable remover thickener in many instances and may be used in connection with other waxy evaporation retarding thickeners, such as paraffin, ceresin, and so forth. The camphor contained in celluloid, as well as other similar solid terpenes, tend to promote the solvent action of alcohols and similar remover solvents when incorporated therewith and also have a desirable action in promoting the permanency, uniformity and other desirable properties of pyroxylin thickened removers. It is also advantageous to use celluloid, pyroxylin or similar non-waxy stiffening materials to secure the desired increase of consistency or mechanical thickening of the remover, since such thickeners have the very desirable property of possessing a substantially uniform thickening action under varying temperature conditions so as to render the consistency of the remover less dependent on ordinary temperature changes. Other cellulose esters, such as nitrohydrocellulose, nitrooxycellulose and other products of the nitration of degraded cellulose are also valuable in this connection. By using such cellulose thickeners to secure the desired mechanical thickening of the remover, it is only necessary to use a relatively small proportion of paraffin, ceresin or other waxy thickener to secure ample evaporation retarding action and keep the remover from drying out for considerable lengths of time. It is also possible to secure the evaporation retarding action by the use of still less of the waxy thickener incorporated in the remover and a small fraction of a per cent. such as one-half or even one-quarter of a per cent. of fractionated hard paraffin is sufficient in many instances. Such fractionated paraffin, for example, may be prepared from the hard commercial grades of paraffin, such as those having melting points of 57° C. or so by dissolving the wax in a suitable solvent such as benzol and then adding a relatively small proportion of wood alcohol to partially precipitate the wax, preferably when the solution is still slightly warm, say at temperatures of about 25 to 30 degrees C. The precipitated material may then be separated and the solvent removed therefrom by pressure or heat, or both, so as to secure the high melting point components of the wax. For example, hard paraffin wax having a melting point of 57 degrees C. may be dissolved in benzol in the proportion of 65 grams of wax in 200 c. c. of benzol to which wood alcohol is added in the proportion of 25 c. c. to the amounts above specified. When this is allowed to stand for three hours or so at room temperature, the wax precipitates to thicken or partly solidify the mixture. On pressing, the solvent may be largely removed and on heating to remove the remaining solvent material the harder components of the wax may be recovered to the extent of about 50 or 55 per cent. of the original paraffin and this harder higher melting point fraction of the wax has a melting point of about 63 degrees C. in the case of some grades of wax treated in this way. Such high melting point fractionated paraffin wax is less soluble in mixtures of remover solvents, such as benzol, alcohol, acetone, or the like, than the lower melting point wax from which it was derived for instance and thus has an increased precipitating and film forming action under conditions of remover service. Such fractionated paraffin wax is also free from soft greasy material usually present in ordinary paraffin and which is desirable for use in removers for some purposes. Similarly fractionated ceresin wax, for instance, is similarly increased in its evaporation retarding action in remover service.

For many purposes it is desirable to use in removers for severe service a considerable proportion of relatively non-volatile liquid preventing the drying of the thickening material which is undesirable when comprising large proportions of pyroxylin or the like. It is desirable to use for this purpose a balanced heavy liquid component in order to have less interference with the evaporation retarding action of the wax when the remover is allowed to remain on the work a long time and this may be secured by the incorporation of relatively non-volatile wax solvent and wax precipitating material to suitably balance the wax solvent properties of this heavy component. Suitable heavy or relatively non-volatile wax solvent materials in this connection are chlorbenzol, liquid chlorinated naphthalene, tetrachlorethane, pentachlorethane, turpentine, wood turpentine, heavy solvent naphtha, gas naphtha, chlorgas naphtha, light Borneo petroleum, nitrotoluol, etc. Suitable heavy or relatively non-volatile remover liquids of relatively less solvent power for wax so as to have a wax precipitating or balancing action with respect to the foregoing are di-propyl ketone, butyrone, methyl propyl ketone, valerone, dibutyl ketone, light and heavy acetone oils, diethyl ketone and chlordiethyl ketone, aldehydes or mixed aldehydes and alcohols, such as formed by the oxidation of amyl alcohol, light and heavy oils of wood tar, especially deodorized heavy oil of wood tar, chlorethyl acetate, stearone or diheptadecylketone, aceto or formo dichlorhydrin, glycerol chlorhydrins, or other derivatives of gas naphtha and other unsaturated petroleum products or olefins, such as the chlorhydrins, olefin oxids, etc., eugenol, allyl alcohol, quasi allyl alcohol, chlorallyl alcohol, benzyl alcohol, acetal, chloracetal, sebacic ether, benzaldehyde, etc.

The main remover solvents may comprise loosening finish solvent material, that is, solvents of a generally alcoholic character or action in removers, such as methyl, ethyl, propyl, butyl and other strict alcohols, preferably in their commercial forms, including denatured alcohol, as well as ketonic solvents, such as methyl ethyl ketone, oil of acetone, acetone, methyl acetone, which may contain about forty per cent. of acetone, some methyl alcohol and considerable higher ketones. Suitable penetrating finish solvent material may also be used, that is, solvent material of a generally benzolic character or action in removers, such as benzol and its homologues, toluol, xylol, and so forth, and their commercial forms such as commercial toluol, solvent naphtha and the somewhat analogous petroleum hydrocarbons, such as naphtha and benzin, as well as carbon-bisulfid, turpentine, wood turpentine, carbon-tetrachlorid and other chlorinated solvents.

A suitable illustrative remover composition may comprise 45 gallons of benzol, 35 gallons of methyl acetone, 10 gallons of methyl or ethyl alcohol, 3 gallons of wood turpentine, 2 gallons of epichlorhydrin, 15 to 35 pounds of scrap celluloid and 3 to 7 pounds of hard paraffin which may be the fractionated high melting point paraffin referred to.

Another suitable illustrative remover composition may comprise 51 gallons of benzol, 15 gallons of methyl acetone, 20 gallons of methyl alcohol, 3 parts of hard fractionated wax, such as fractionated paraffin, ozocerite or beeswax, 25 parts of celluloid scrap, 5 gallons of wood turpentine and 5 gallons of light oil of wood tar.

Another suitable illustrative remover composition may comprise 30 gallons of wood alcohol, 20 gallons of methyl ethyl ketone, 20 gallons of chlorbenzol, 30 gallons of 62° gasolene, 15 pounds of paraffin wax, 10 pounds of nitrocellulose and 10 pounds of wood flour.

Another illustrative remover may comprise one gallon of methyl acetone and one gallon of wood alcohol thickened with 10 ounces of nitrocellulose or soluble cotton, and four ounces of camphor dissolved in the solvents, together with waxy thickeners, such as one ounce of paraffin and one ounce of Japan wax.

Another illustrative composition may comprise one gallon of methyl acetone thickened with 8 ounces of scrap celluloid and one ounce of Japan wax or paraffin.

Another composition may comprise one quart of methyl acetone, one quart of wood alcohol and two quarts of benzol in which five ounces of ceresin and seven ounces of scrap celluloid have been incorporated by preliminary solution.

It is of course understood that the nitrocellulose or pyroxylin thickener is preferably first dissolved in the more energetic solvents therefor which may be effected at a slight increase of temperature preferably below a blood heat to prevent undesirable coagulation. The wax may then be dissolved in the remover solvents which have the most energetic solvent action thereon and the two solutions incorporated and thoroughly agitated to secure uniformity.

Having described this invention in connection with a number of illustrative ingredients, formulas, proportions and processes, to the details of which disclosure the invention is not of course to be limited, what is claimed as new is:

1. The finish remover comprising approximately 45 gallons of benzol, 35 gallons of methyl acetone, 10 gallons of methyl alcohol, 3 gallons of wood turpentine, 2 gallons of epichlorhydrin, 15 to 35 pounds of celluloid and 3 to 7 pounds of hard fractionated paraffin wax having a melting point of 60° C. or more.

2. The finish remover comprising approximately 45 gallons of benzol, 45 gallons of loosening finish solvent material comprising methyl alcohol, 3 gallons of wood turpentine, 2 gallons of epichlorhydrin, 15 to 35 pounds of celluloid and 3 to 7 pounds of hard fractionated mineral wax.

3. The finish remover comprising approximately 45 gallons of penetrating finish solvent material comprising benzol, 45 gallons of loosening finish solvent material comprising wood alcohol, 5 gallons of relatively non-volatile substantially neutral remover solvent, several per cent. of celluloid and incorporated paraffin wax.

4. The finish remover comprising approximately equal parts of penetrating and of loosening finish solvent material including wood alcohol, a number of per cent. of relatively non-volatile substantially neutral remover solvent, several per cent. of soluble cellulose ester and incorporated camphor and mineral wax.

5. The finish remover consisting in large part of composite volatile organic finish softening material including loosening finish solvent material and several per cent. at least of relatively non-volatile neutral remover solvent and incorporated thickening material including dissolved celluloid and mineral wax.

CARLETON ELLIS.

Witnesses:
HARRY L. DUNCAN,
JESSIE B. KAY.